United States Patent [19]

Groteke

[11] 4,394,271

[45] Jul. 19, 1983

[54] APPARATUS AND METHOD FOR FILTRATION OF MOLTEN METAL

[76] Inventor: Daniel E. Groteke, 1228 Ridge Cliff Rd., Cincinnati, Ohio 45215

[21] Appl. No.: 256,829

[22] Filed: Apr. 23, 1981

[51] Int. Cl.³ ............................................. C22B 9/02
[52] U.S. Cl. .................................. 210/773; 210/471; 210/510; 75/68 R; 266/227; 266/238
[58] Field of Search ............... 210/773, 470, 471, 510, 210/767, 774; 75/93 E, 68 R; 266/227, 238, 242

[56] References Cited

U.S. PATENT DOCUMENTS

| | | | |
|---|---|---|---|
| 3,010,712 | 11/1961 | Judge et al. | 266/34 |
| 3,149,960 | 9/1964 | Robinson | 75/68 |
| 3,537,987 | 11/1970 | Copeland | 210/20 |
| 3,654,150 | 4/1972 | Eccles | 210/69 |
| 3,729,097 | 4/1973 | Collins et al. | 210/69 |
| 3,737,304 | 6/1973 | Blaydon et al. | 75/68 R |
| 3,753,690 | 8/1973 | Emley et al. | 75/68 R |
| 3,767,382 | 10/1973 | Bruno et al. | 75/68 R |
| 3,870,511 | 3/1975 | Szekely | 75/68 R |
| 3,893,917 | 7/1975 | Pryor et al. | 210/69 |
| 3,907,962 | 9/1975 | Ogiso | 264/332 |
| 3,962,081 | 6/1976 | Yarwood | 210/69 |
| 4,007,923 | 2/1977 | Chia | 266/217 |
| 4,024,056 | 5/1977 | Yarwood et al. | 210/69 |
| 4,081,371 | 3/1978 | Yarwood et al. | 210/69 |
| 4,113,241 | 9/1978 | Dore | 266/227 |
| 4,124,506 | 11/1978 | Dore | 210/69 |
| 4,144,054 | 3/1979 | Stary et al. | 75/68 R |
| 4,165,235 | 8/1979 | Dantzig et al. | 75/93 |

*Primary Examiner*—Thomas G. Wyse
*Attorney, Agent, or Firm*—Janine J. Weins; Michael J. Weins

[57] ABSTRACT

An apparatus and method for filtering molten metal is disclosed. The apparatus includes a crucible, a portion of which is a porous filter material. Attached to the rim of the crucible is a shock resistant ring. The crucible is positioned such that the porous filter material is submerged in the molten metal, and the rim is held above the surface of the molten metal by a brace which is attached to a fixed bracket.

The molten metal is filtered by seeping through the porous filter material into the crucible. The filtered molten metal is extracted from the crucible.

18 Claims, 5 Drawing Figures

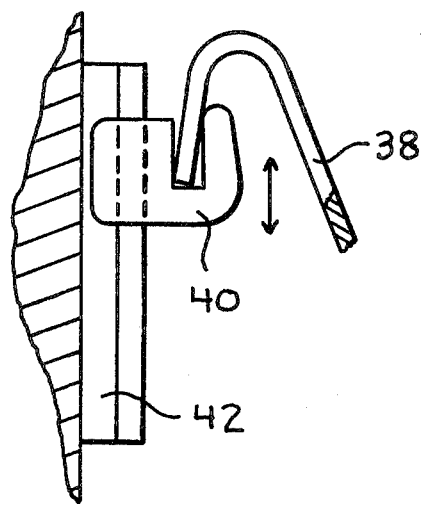
FIG. 3.
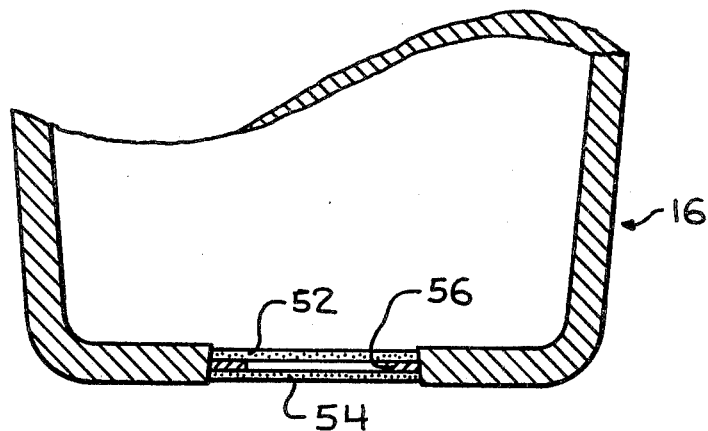
FIG. 5.
FIG. 4.
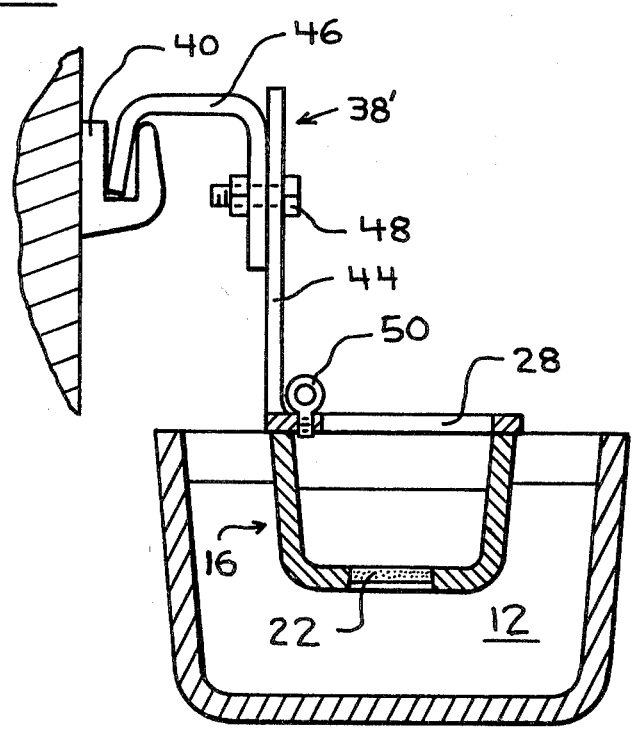

APPARATUS AND METHOD FOR FILTRATION OF MOLTEN METAL

FIELD OF INVENTION

The present invention relates to filtration of molten metal.

BACKGROUND ART

Molten metal, and in particular molten aluminum, frequently contains impurities which are detrimental to the resulting cast products. These impurities may be oxides of the metal, other inclusions introduced by fluxes used during melting, or products formed by interaction with the furnace lining.

One technique for removing oxides and other impurities from molten metal is taught in U.S. Pat. No. 4,113,241 issued to Dore. This patent teaches placing a floatable crucible in a bath of molten metal. A portion of the crucible is porous and serves as a filter. The molten metal will filter through the porous filter material and thereby fill the crucible. The metal to be cast is ladled from the crucible. Since the crucible is floatable it is buoyant and the rate of fill will be limited by the rate at which the crucible settles into the molten metal bath. For the crucible of the Dore patent to float in molten aluminum it must be made of a light material, such as graphite, which may fracture if impacted by the ladle during removal of the molten metal from the crucible.

SUMMARY OF INVENTION

The present invention provides an apparatus for filtering molten metal. The apparatus includes a crucible, a portion of the crucible is made of a porous material which serves as a filter. The crucible has a rim and attached to the rim is a shock resistant ring. Attached to the ring is a brace which attaches to a rigidly mounted bracket. The bracket is positioned so as to assure that the porous filter portion of the crucible will be submerged in the molten metal while the ring is maintained above the level of the molten metal.

The present invention also relates to a method for filtration of molten metal. A crucible, a portion of which is a porous filter material, is partially submerged in molten metal. The crucible is rigidly mounted so as to maintain the porous filter portion of the crucible submerged in the molten metal, and the rim and ring above the surface of the molten metal. The molten metal flows through the porous filter material into the crucible. The filtered metal is extracted from the crucible by a ladle.

BRIEF DESCRIPTION OF THE FIGURES

FIG. 3 illustrates a slidable bracket for adjusting the position of the filter with respect to the molten metal.

FIG. 4 illustrates an extendable brace for adjusting the position of the filter with respect to the molten metal.

FIG. 5 illustrates an embodiment of the present invention in which porous materials of two different mesh size are used to filter the molten metal.

BEST MODE FOR CARRYING OUT THE INVENTION

Figure 1:
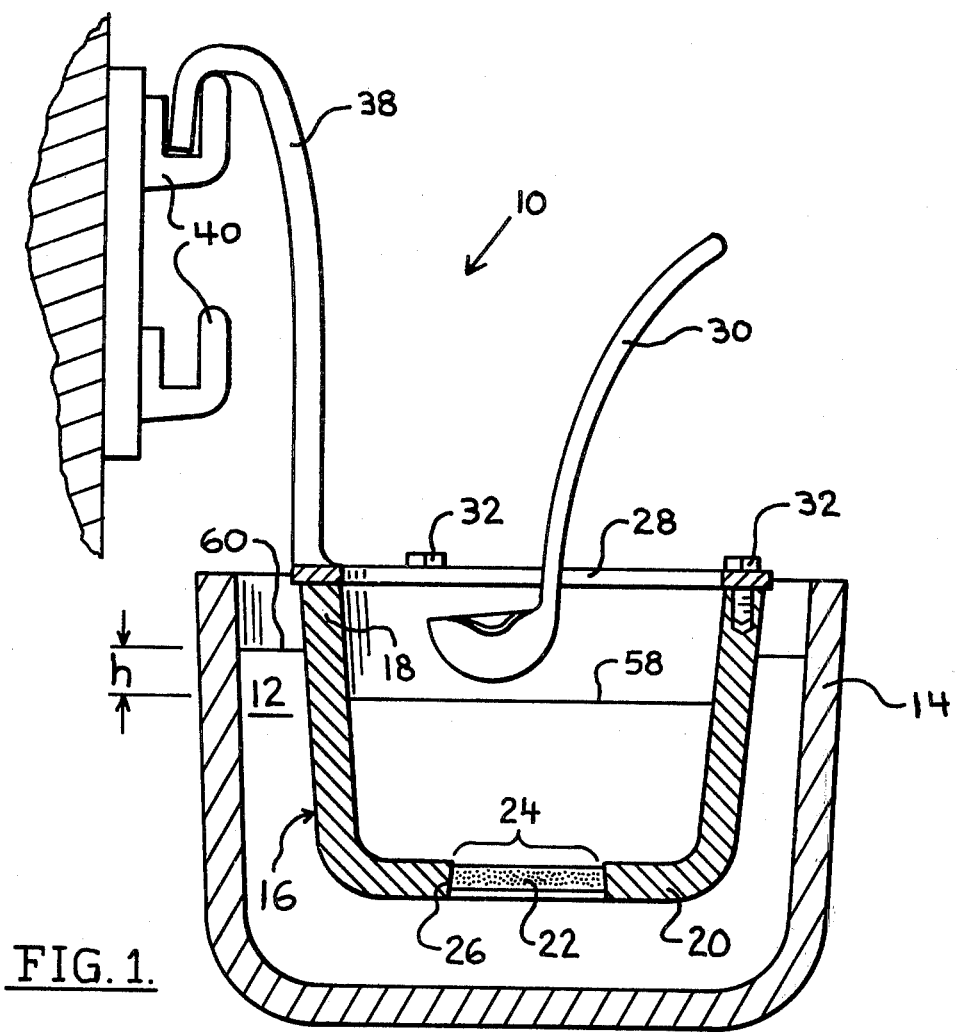
FIG. 1 is a schematic representation of one embodiment of the present invention.

FIG. 1 is a schematic representation of one embodiment of the present invention. The metal filter apparatus 10 is employed for removing particulate and purifying a molten metal. The molten metal bath 12 is contained in a melting or holding furnace 14. The apparatus 10 has a crucible 16 having a rim 18 and a bottom 20. The crucible 16 can be made of any refractory material that does not interact with the molten metal. Particularly effective crucible materials are clay graphite and silicon carbide. It is preferred to use either a clay graphite, or a silicon carbide crucible to minimize the cooling effect of the crucible material.

The crucible can be cast from a clay/alumina castable refractory ceramic such as described in Kaiser Refractories Bulletin 119-R. Crucibles of cast refractories, because of their thermal properties, will increase the steady state temperature drop between the metal in the molten bath 12 and the metal in the crucible 16.

It should be appreciated that as the temperature drop between the molten metal bath 12 and the metal in the crucible 16 is increased the temperature of the molten metal bath 12 must be increased to maintain the proper ladling temperature. An increase in the furnace temperature will increase the energy costs, will increase the hydrogen solubility in the molten metal, and will increase the interaction of the molten metal with both the furnace lining and the crucible.

At least a portion of the crucible 16 is made of a porous ceramic filter material. These ceramic materials are typically alumina, zirconia, magnesia, titanium dioxide, silica and mixtures thereof. Such filter materials are known in the art, and for example U.S. Pat. No. 3,962,081 discloses filter materials which can be employed in the present invention. Preferably the filter has a pore size of 20 to 80 pores per linear inch, a void fraction between 0.65 and 0.95, and an air permeability of from about 100 to $1000 \times 10^{-7} cm^2$.

In FIG. 1 the filter 22 is inserted in a hole 24 in the bottom 20 of the crucible 16. Preferably the walls 26 of the hole 24 are tapered, with the diameter of the hole greatest at the bottom 20 of the crucible 16. The filter 22 may be bonded to the crucible 16 by a furnace cement such as those principally composed of alumina and/or silica.

The filter 22 may also be affixed to the crucible 16 by packing a resilient sealing material between the walls 26 of the hole 24 and the filter 22. However since the resilient material may place mechanical stress on the crucible-filter assembly and thereby reducing its life, it is preferred to cement the filter into position.

Figure 2:
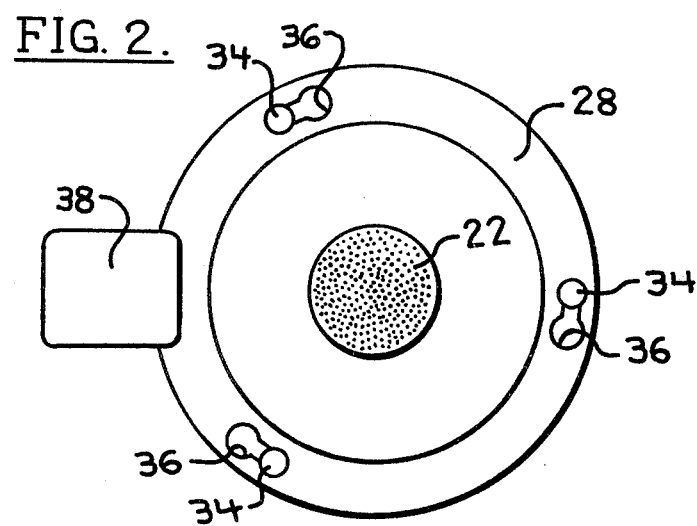
FIG. 2 is a schematic representation illustrating the use of lugs to attach a ring to the crucible.

Attached to the rim 18 of the crucible 16 is a shock resistant ring 28. The ring 28 serves to prevent the brittle crucible from fracturing by shielding the rim 18 from impact by a ladle 30 employed to remove the molten metal. The crucible 16 can be attached to the ring 28 by a series of bolts 32 which are threaded into the rim 18 of the crucible 16. In the event that the crucible material can not readily be tapped, lugs can be provided as is illustrated in FIG. 2. The lugs 34 on the crucible 16 may then be locked into the slots 36 in the ring 28. A brace 38 couples to a bracket 40 and serves to index the crucible 16 with respect to the molten metal bath 12. To accommodate changes in the level of the molten metal bath 12 in the furnace 14, multiple brackets 40 can be employed as is illustrated in FIG. 1. It is also possible to provide means for adjusting the position of the crucible 16 relative to the furnace 14 by providing a bracket 40 on a slide 42 as illustrated in FIG. 3. Alternately, as illustrated in FIG. 4, an adjustable brace 38' which has a first segment 44 and a second segment 46 which overlap and are secured by a coupling means such as a bolt 48, can be used to provide an extension which can be varied to change the position of the crucible 16 with respect to the molten metal bath 12.

The position of the crucible 16, with respect to the molten metal bath 12, can be adjusted by loosening the bolt 48 after insertion of the crucible 16 into the molten metal bath 12. When the crucible 16 is initially inserted into the molten metal bath 12 the relatively cool crucible 16 will chill the molten metal, this will retard the rate at which the crucible 16 will fill, and the crucible 16 will remain buoyant. As the filter 22 warms, the molten metal will more readily pass through the filter 22, and the crucible 16 will further settle into the molten metal bath 12. The bolt 48 may be tightened when the crucible 16 has reached the desired position.

If subsequent repositioning of the crucible is sought, or if it is desired to remove the crucible, and eyebolt 50 can be attached to the shock resistant rim 28 to provide for attachment of a hoist mechanism not shown to aid in the positioning and/or removal of the crucible 16.

The life expectancy of the filter 22 can be extended, and/or finer filtration achieved, by employing a two part filter as is illustrated in FIG. 5. A first filter segment 52, is spaced apart from a second filter segment 54, with a spacer 56. The first filter segment 52 preferably has a pore size of between about 40 to 90 pores per linear inch, a void fraction of between 0.75 and 0.85, and a permeability of from between about 200 to $500 \times 10^{-7} cm^2$, while the second filter segment 54 has a pore size of between about 10 to 15 pores per linear inch, a void fraction of between 0.8 to 0.95, and a permeability of from about 600 to $2000 \times 10^{-7} cm^2$.

In carrying the invention into practice the crucible 16 is placed in the molten metal bath 12 as is illustrated in FIG. 1. The rim 18 of the crucible 16 is maintained above the surface of the molten metal bath 12. The molten metal level 58 in the crucible 16 and the level 60 in the molten metal bath 12 surrounding the crucible 16, are allowed to equalize by liquid metal passing through the filter 22. Once the metal levels have equilibrated metal may be extracted from the crucible 16 with a ladle 30. The removal of metal will drop the molten metal level 58 in the crucible 16, and establish a differential head, h, which will cause the transfer of molten metal from the molten metal bath 12 through the filter 22 into the crucible 16. It is preferred that the extraction rate be limited so that the maximum differential head, h, is no more than 4 inches. Furthermore it is also preferred that the metal flux rate through the filter be between about 0.1 lbs/in²min to about 1 lbs/in²min. A larger head should be avoided since it would increase the flow rate through the filter and could cause less effective filtration of the molten metal. By having the crucible 16 rigidly mounted a head is maintain when molten metal is removed, this head will cause the refill rate to be more rapid than it would be if the crucible were free floating. In the prior art free floating crucibles the rate the crucible settles into the molten metal bath will be the rate of refill.

By increasing the filter area the flow rate can be increased. It is preferred that the filter area be at least 1/5th the area of the average horizontal cross section of the crucible.

Since the crucible is held in the molten metal bath by a brace that is attached to a rigid mount it is possible to determine the condition of the filter from the refill rate. By measuring the time it takes to refill the crucible it is possible to determine if the filter is plugging. It has been found that when the fill time is reduced by a factor of 10 the filter should be replaced.

Because the crucible is attached to a rigidly mounted brace, a head can be maintained while the crucible is filling with metal, this head allows the filter life to be extended beyond the life of a filter in a free floating crucible.

EXAMPLE I

A clay graphite crucible was constructed with a diameter of approximately 12 inches. The crucible had a hole 7 inches in diameter into which a ceramic filter was inserted. The filter had 20 to 30 pores per linear inch. The filter was submerged in a molten aluminum bath as illustrated in FIG. 1. Metal was removed from the crucible by ladling to reduce the molten metal level in the crucible 3 inches. The level in the crucible was then allowed to recover. It was found that during steady state operation when 20 ladle per hours were removed, the flux rate through the filter was about 0.15 lbs/in²-min, and the temperature of the metal in the crucible was 60° F. less than the temperature of the molten metal in the furnace.

EXAMPLE II

A silicon carbide crucible with the geometry and operating conditions described in Example I was employed. It was found that the temperature of the metal in the crucible was 50° F. less than the metal in the surrounding furnace during steady state operation.

What I claim is:

1. A liquid metal filter apparatus for purifying a metal bath, comprising:
    a crucible having a rim and a bottom;
    a portion of said crucible being a porous ceramic material having an open cell structure characterized by a plurality of interconnected pores, said ceramic material serving as a filter;
    a shock resistant ring attached to said rim;
    a brace rigidly attached to said ring; and
    a bracket rigidly positioned external to the molten metal bath and said brace being attached to said bracket for rigidly positioning said crucible with respect to the molten metal bath.

2. The apparatus of claim 1 wherein said crucible is an impervious material and, said bottom of said crucible has a hole therethrough into which a porous filter is inserted.

3. The apparatus of claim 1 further comprising:
    means for adjusting the position of said filter with respect to the metal bath.

4. The apparatus of claim 3 wherein said means for adjusting said filter is a slidable insert on said bracket.

5. The apparatus of claim 3 wherein said means for adjusting said filter comprises:
    one or more inserts for said brace.

6. The apparatus of claim 3 wherein said means for adjusting said filter is an extendable brace.

7. The apparatus of claim 2 wherein and said filter is attached to said crucible with cement.

8. The apparatus of claim 7 wherein said hole is tapered such that the hole is largest at the crucible bottom.

9. The apparatus of claim 3 wherein said filter is comprised of:
a first filter segment, and a second filter segment spaced apart from said first filter segment by a spacer, said second filter segment having a pore size greater than the pore size of said first filter segment.

10. The apparatus of claim 2 wherein said ring is detachable from said crucible, said ring being attached to said crucible with bolts which pass through said ring and thread into said crucible.

11. The apparatus of claim 2 wherein said ring is detachable from said crucible, said ring being attached to said crucible by lugs which lock into said ring.

12. The apparatus of claim 2 wherein said filter has between about 20 to 80 pores per linear inch, with a void fraction 0.65 to 0.90, and permeability of 100 to $1000 \times 10^{-7} cm^2$.

13. The apparatus of claim 9 wherein said first filter segment has a pore size between about 40 to 90 pores per linear inch, a void fraction of 0.75 to 0.85, and a permeability of 300 to $500 \times 10^{-7} cm^2$, and said second filter has between 10 to 15 pores per linear inch, with a void fraction of between 0.85 to 0.95 and a permeability of between 600 to $2000 \times 10^{-7} cm^2$.

14. The apparatus of claim 2 further comprising:
an eyebolt attached to said shock resistant ring for aiding in positioning of said crucible.

15. A method for filtration of liquid metal from a molten bath comprising:
providing a crucible with a rim and a ring attached thereto, said ring being more shock resistant than said crucible, said crucible having a bottom with a passage therethrough which is fitted with a porous filter;
submerging said filter into said liquid metal while maintaining said rim above the surface of said liquid metal;
rigidly positioning said crucible with respect to the molten metal bath by means of a brace rigidly attached to said ring and to a bracket external to said liquid metal bath;
allowing liquid metal to pass through said filter to fill said crucible; and
extracting said liquid metal from said crucible.

16. The method of claim 15 further comprising limiting the difference in the metal level between the molten bath and the crucible to less than 4 inches and limiting the flux through said filter to between about 0.1 $lbs/in^2$-min to about 1 $lbs/in^2 min$.

17. The method of claim 16 wherein the material for said crucible i selected from the group of clay graphite and silicon carbide refractories, with said filter material being a porous ceramic body selected from the group of silica or alumina.

18. The method of claim 15 further comprising:
monitoring the flux of molten metal through said filter; and
when the crucible filling time has increased by a factor of about ten replacing said filter.

* * * * *